| United States Patent [19] | [11] 4,067,829 |
|---|---|
| Garrett | [45] Jan. 10, 1978 |

[54] PREPARATION OF A CURED RESOLE RESIN

[75] Inventor: Walter L. Garrett, Freeland, Mich.

[73] Assignee: The Dow Chemical Company, Midland, Mich.

[21] Appl. No.: 710,985

[22] Filed: Aug. 2, 1976

Related U.S. Application Data

[63] Continuation-in-part of Ser. No. 342,781, March 19, 1973, abandoned.

[51] Int. Cl.$^2$ .................................................. C08J 9/32
[52] U.S. Cl. ............................. 260/2.5 F; 260/2.5 B; 260/38; 260/60
[58] Field of Search .......................... 260/2.5 F, 60

[56] References Cited

U.S. PATENT DOCUMENTS

| 2,797,201 | 6/1957 | Veatch et al. | 260/2.5 F |
| 2,806,509 | 9/1957 | Bozzacco et al. | 260/2.5 F |
| 3,062,682 | 11/1962 | Morgan et al. | 260/2.5 F |
| 3,138,563 | 6/1964 | Morgan et al. | 260/2.5 F |
| 3,290,260 | 12/1966 | Buccigross | 260/2.5 F |
| 3,663,489 | 5/1972 | Byerley et al. | 260/2.5 F |

FOREIGN PATENT DOCUMENTS

| 1,090,741 | 11/1967 | United Kingdom | 260/2.5 F |

*Primary Examiner*—Morton Foelak
*Attorney, Agent, or Firm*—R. B. Ingraham

[57] ABSTRACT

Cured phenolic resole bodies including foams which are generally non-corrosive are prepared by including in the curable mixture an inorganic alkali-containing particulate solid such as certain glasses.

11 Claims, No Drawings

PREPARATION OF A CURED RESOLE RESIN

This application is a Continuation-In-Part of our Application Ser. No. 342,781, filed Mar. 19, 1973, now abandoned.

Phenolic articles such as foams prepared from resole resins are well known in the art and some are described in U.S. Pat. Nos. 2,933,461; 3,298,973; 3,389,094 and 3,389,095. Such phenolic materials have a number of particularly beneficial properties: they are thermoset, relatively non-flammable and are readily formed to a variety of shapes and forms; they are useful for insulation and so-called structural foams, structural foams being foams of higher densities such as in the range of from about 20 to 50 pounds per cubic foot. Phenolic resole resin cast bodies such as foams in general have a significant and outstanding disadvantage. Such thermoset bodies are prepared employing a catalyst which is usually a strong acid and the residual acid remaining in the body often induces corrosion in metals associated with the body. Attempts have been made to provide a convenient neutralizing agent for acidic catalysts in resole foams. However, such attempts have not been entirely satisfactory. Neutralizing agents have been encapsulated in a manner such as is described in U.S. Pat. No. 3,138,563.

It would be desirable if there was available an improved method for the preparation of bodies from phenolic resins.

It would also be desirable is there were available an improved method for the preparation of non-corrosive bodies from phenolic resole resins.

It would further be desirable if there were available an improved generally non-corrosive resole resin body of a cellular nature.

These benefits and other advantages in accordance with the present invention are achieved in a method for the preparation of thermoset synthetic resinous resole bodies, the steps of the method comprising providing in intimate admixture (a) a resole resin, (b) a catalyst for the resole resin, the catalyst comprising a strong inorganic or organic acid, curing the mixture until the mixture has hardened to a self-supporting mass, the improvement which comprises including within said mixture a particulate, inorganic, solid, acid-accepting material, with the further limitation that when two parts by weight of the acid-accepting material is added with gentle stirring to 100 parts by weight of a solution of hydrochloric acid in deionized water, the solution having a pH of 1, at a temperature of 25° C, the pH of the solution increases from about 0.1 to about 1 pH unit in 60 minutes with the further limitation that the acid-accepting material will accept 0.08 to 0.3 gram of hydrochloric acid per gram of acid-accepting material. A particularly advantageous embodiment of the invention includes a foaming agent within the resin forming mixture.

Also contemplated within the scope of the present invention is an improved cured resole resin, the resole resin comprising a body of a continuous cured resole resin containing a plurality of particles of a solid, inorganic, acid-accepting material, with the further limitation that when two parts by weight of the acid-accepting material is dispersed with stirring in 100 parts by weight of an aqueous solution of hydrochloric acid at 25° C, the solution having a pH of 1, the pH of the solution increases from about 0.1 to about 1 pH unit within a period of 60 minutes.

Phenolic resins suitable for practice of the present invention are alkaline-catalyzed phenol aldehyde concentration products commonly called one-step resins or "resoles", often referred to as "A" stage resinification, the "C" stage being the fully cured thermoset resin stage. The resoles are generally liquid and water soluble; they usually contain or consist of from about 3 to 25 percent by weight of water and have viscosities of from about 200,000 to 200 centipoises, respectively, at 25° C. Minor amounts of water can be tolerated in the resole resins, although it is preferred that the water content be kept to less than 20 percent by weight of the resole. Advantages are obtained by employing mixtures of two or more of the resole resins, for example, in order to control the initial viscosity. Resole resins or mixtures having a viscosity of from about 300 to 100,000 centipoises at 25° C are preferred.

The resole resins employed in this invention are the reaction products of a phenol and an aldehyde. Usually from about 1.1 to 3 mols of the aldehyde per mol of the phenol (preferably from 1.5 to 2.5 mols of the aldehyde per mol of the phenol) are employed in producing suitable resole resins. Typical of the phenols that are useful in producing suitable resole resins are those represented by the formula

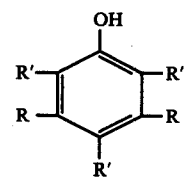

wherein at least two groups represented by R' are hydrogen atoms and the groups represented by R and any remaining group represented by R' are hydrogen atoms or groups which do not impede the condensation of the phenol with an aldehyde (e.g., a substituent such as halogen atom or a hydroxy, alkyl or aryl group). Illustrative of suitable phenols are phenol, cresols (particularly m-cresol), xylenols (particularly 3,5-xylenol) and dihydroxybenzenes (particularly resorcinol). Typical of the aldehydes that are useful in producing suitable resole resins are formaldehyde (including the oligomers and polymers of formaldehyde such as trioxane), furfural, sugars and cellulose hydrolyzates. Such aldehydes can be employed without dilution or dissolved in suitable solvents including aqueous alcohols (e.g., aqueous methanol, n-propanol, isobutanol or n-butanol). The reaction of the phenol and the aldehyde is conducted in the presence of a basic catalyst such as ammonia, sodium hydroxide, potassium hydroxide or barium hydroxide in an amount of from 0.1 to 0.001 mol of catalyst (or preferably from 0.05 to 0.002 mols of catalyst) per mol of the phenol. The resole resin is generally a liquid.

The resole resins used in this invention are usually not highly polymerized so that they are normally liquid and generally water-soluble. This is often referred to as the "A" stage of resinification as distinguished from the "C" stage which is fully cured thermoset resin stage. As the condensation between the phenol and aldehyde progresses from the liquid low molecular weight resins, the molecular weight of the condensation product increases and the resin exhibits a corresponding increase in vicosity. Advantages are also made of mixtures of several different resole resins in order to control the initial viscosity and reactivity of the curable compositions. Control of viscosity is particularly significant when, for example, mixtures of a high viscosity and a low viscosity resin have been used to control the ultimate density of a foam. Similarly, a mixture of a liquid and a solid resole can be employed to the same effect. Any resole resin either initially liquid or made fluid by the addition of any agent or by any techniques may be employed in the present invention.

The acids employed as catalysts are the strong inorganic acids such as sulfuric acid, hydrochloric acid, phosphoric acid, nitric acid; i.e., the strong mineral acids, or aqueous solutions of said acids; e.g., a concentracted aqueous solution of hydrochloric acid, or strong organic acids such as benzene sulfonic acid, toluene sulfonic acid, phenol sulfonic acid, xylene sulfonic acid, β-naphthalene sulfonic acid and α-naphthalene sulfonic acid. Mixtures of any two or more of the acids can also be used.

Oftentimes in order to hasten mixing in the preparation of resole resin foams a surfactant or surface active agent is employed, and beneficially a nonionic surfactant such as the reaction or condensation product of an alkylene oxide having from 2 to 4 carbon atoms in the molecule with a compound such as higher alkylphenols having from 8 to 12 carbon atoms in the alkyl group, fatty acids having from 12 to 22 carbon atoms, and alkyl silanes and silicones. Among suitable surfactants are (a) the polyoxyethylene ethers of alkyl phenols having the general formula

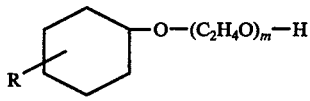

wherein R is an alkyl group having from 8 to 12 carbon atoms and m is an integer from about 8 to 20, (b) ethoxylated castor oil and ethoxylated hydrogenated castor oil; i.e., the condensation product of said castor oils and from 8 to 20 mols of ethylene oxide per mol of said castor oil, (c) copolymers of ethylene oxide and propylene oxide containing from 8 to 20 moieties of each of said alkylene oxides, and alkyl silane polyoxyalkylene block copolymers similar to those described in U.S. Pat. No. 2,834,748.

Beneficially, the surfactant is the condensation product of ethylene oxide and nonyl phenol having a molecular weight of about 880, or an alkyl silane/alkylene oxide block copolymer of the formula

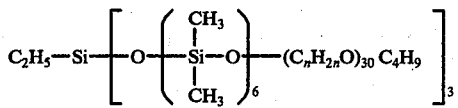

wherein $C_nH_{2n}O$ is a mixed oxyethylene/oxypropylene block of about 17 oxyethylene units and about 13 oxypropylene units.

A wide variety of solid, inorganic, acid-accepting agents may be employed for the practice of the present invention. Typical of such materials are particulate glasses and silicates. The suitability of any potential acid-accepting agent is readily determined by the following test: 2 parts by weight of the particulate material being evaluated are dispersed with gentle stirring in 100 parts by weight of an aqueous hydrochloric acid solution having a pH of 1.0. The pH change of the solution is observed and if the pH is increased by about 0.1 to about 1 pH unit after 60 minutes the material is suitable as an acid acceptor. The test is conducted at 25° C using glass and calomel electrodes. It is preferred that the increase in pH be within the range 0.1 to about 0.3 units per hour. For most applications it is desirable that the solid, inorganic, acid acceptor be in particulate form; beneficially passing through a 20 mesh U.S. Sieve Size screen, and more beneficially passing an 80 mesh U.S. Sieve Size screen. As the acid-accepting rate is dependent on the surface area, a material which, when evaluated by the foregoing test, is eminently satisfactory with a particle size range passing a 50 mesh screen and being held on an 80 mesh screen, and may be totally unsatisfactory if further subdivided so that it passes a 325 mesh screen. Particularly advantageous acid acceptors for use in the present invention are certain glass microspheres either hollow or solid and certain sodium silicates. It is critical that the foregoing pH change limitations are met.

Generally it is desirable to employ, in the practice of the present invention, a quantity of acid acceptor at least about sufficient to neutralize the amount of acid employed in the catalyst. As a matter of convenience in determining the amount of acid acceptor to employ, an acid acceptance value is determined for each acid acceptor. Such a value is readily determined by dispersing one gram of an acid acceptor in 100 milliliters of 0.1 normal aqueous hydrochloric acid. The dispersion is agitated for 24 hours at a temperature of 25° C and titrated with 0.1 normal aqueous sodium hydroxide to a pH of 7. The weight in grams of hydrochloric acid neutralized by the acid acceptor is then calculated. An acid acceptance value of from about 0.08 to about 0.3 grams of hydrochloric acid is satisfactory and is preferably from about 0.1 to 0.25 grams of hydrochloric acid. Generally it is desirable to employ the acid acceptor in at least a stoichiometric amount, based on the amount of strong acid employed as catalyst for the resole resin. Beneficially, the amount employed is from about 100 to 150 percent of the stoichiometric quantity required, and advantageously from about 100 to 120 percent of the stoichiometric amount of the acid acceptor required to neutralize the catalyst.

If desired, suitable fillers are employed with benefit. The fillers may contribute bulking or reinforcement. Suitable fillers are those which are non-reactive or substantially non-reactive with the catalyst or resole resin under conditions of polymerization. Fillers are readily evaluated by prepared resin catalyst mixtures in the absence of the acid acceptor. If the mixture cures, the filler is suitable; if no curing or poor curing is obtained, the filler is unsuitable. Useable fillers include wood flour, carbon black, glass fibers, polyester fibers, polyacrylonitrile fibers, hollow phenolic microspheres, carbon microspheres, fibrous slag, expanded perlite such as is disclosed in U.S. Pat. Nos. 2,421,902; 2,521,190; 2,639,132; hollow inorganic microspheres such as are disclosed in U.S. Pat. No. 2,797,201; foamed clay microspheres such as are set forth in U.S. Pat. No. 2,676,892. The teachings of the foregoing patents are herewith incorporated by reference thereto. Clays, including bentonite, kaolin, expanded vermiculite and non-expanded vermiculite, ceramic foam particles, sand, and non-cellular inorganic material are also employed with benefit.

Synthetic resinous thermoplastic microspheres useful in the practice of the present invention are well known in the art and the preparation thereof is described in U.S. Pat. No. 3,615,972, the teachings of which are herewith incorporated by reference thereto. The expandable microspheres which are useful in the present invention are those expandable microspheres which are generally insoluble in the resole resin. A rapid method for determining the suitability of any expandable microsphere in the resole resin composition is readily determined by admixing 2 parts by weight of thermoplastic expandable microspheres with 98 parts by weight of a resole resin, and in the absence of a curing catalyst for the resole resin, heating the resin/microsphere mixture to a temperature sufficient to cause foaming and observing the behavior of the microspheres through an optical microscope. If the microspheres dissolve and loose their distinct spherical identity prior to foaming or expanding they may be unsatisfactory for the particular resole resin.

Accordingly, the amount of acid catalyst can vary widely, depending upon the quantity of acid used to initiate the reaction of the resole. In general, the amount of acid can range from 0.5 to 30 parts per 100 parts of the resole resin, the amount depending upon the strength of the acid. For example, good results are obtained with from 1 to 5 parts of 37 percent hydrochloric acid, or 50 percent sulfuric acid, phosphoric acid or nitric acid. Also, good results are obtained with from 3 to 10 parts of any isomer or mixture thereof of benzene sulfonic acid, toluene sulfonic acid, phenol sulfonic acid, xylene sulfonic acid or naphthalene sulfonic acid.

The resole resins as previously mentioned beneficially can have a viscosity between 200 and 200,000 centipoise at 25° C. However, the resole resins are advantageously employed or blended with the catalyst and blowing agent and latent acid acceptor at temperatures such that resin viscosities not exceeding about 20,000 centipoise, and preferably from about 500 to 15,000 centipoise, are obtained. The resole resins of high viscosity are preferably heated to a temperature below the expansion temperature of the blowing agent (if employed) such as to reduce the viscosity to the preferred range and is thereafter mixed or blended with the catalyst acid acceptor and/or blowing agent or vice versa and cured and optionally foamed.

Resinous bodies, including foams in accordance with the present invention, are readily prepared by admixing the components simultaneously - the resole resin, catalyst, acid acceptor and optionally, filler and blowing agent. Beneficially, it is often desirable in the preparation of cured resole resin foam to mix catalyst, blowing agent and surfactant to form an emulsion with the aqueous catalyst as the continuous phase. The catalyst emulsion is mixed rapidly with the resole resin (including, if desired, the filler) prior to curing.

The invention is further illustrated but not limited by the following examples wherein, unless otherwise specified, the corrosive nature is evaluated by inserting at least the cutting edge of a steel industrial grade razor blade into the foam, storing the sample at ambient temperature and humidity for at least 24 hours, removing the razor blade and visually inspecting it for rust. The acidic nature of the foams produced in the following examples are evaluated by a foam pH test. The test consists of providing a one gram portion of the foam which is sliced into cubes not exceeding ¼ inch on an edge. The foam pieces are then placed in a 4 ounce bottle containing 2 ounces of distilled water. The bottles and contents are then shaken for a period of 16 hours to extract any acidic components present in the foam. The pH of the water extract is then measured with a pH meter employing a glass electrode and the resultant pH referred to as the foam pH.

EXAMPLE 1

A phenol/formaldehyde resole resin is prepared in the following manner: a charge of 188 grams (2 mols) of phenol, 243 grams of aqueous 37 weight percent (3 mols) of formaldehyde solution and 1.88 grams of flake sodium hydroxide as catalyst, is placed in a glass reaction vessel equipped with a reflux condenser and stirrer. The mixture is stirred and heated at 65° C for 6 hours, then neutralized to a pH of about 7.0 with oxalic acid. The neutralized mixture is stirred and heated under reduced pressure; i.e., subatmospheric pressure, while removing volatile ingredients including water to leave a residue or product consisting of about 80 percent by weight resole resin and about 20 percent water. The product has a viscosity of 6000 centipoise at 25° C. A catalyst mixture is prepared by employing equal parts of ethylene glycol and concentrated hydrochloric acid. The catalyst used is 5.4 cubic centimeters per 90 grams of the resole resin, plus 1.08 grams of an alkylsilane/alkylene oxide block copolymer commercially available under the trade designation "DC 193" manufactured by the Dow Corning Corporation, and about 6 cubic centimeters of 1,1,1,-trichloro-2,2,2-trifluoroethane. Various foams are prepared employing the foregoing basic recipe. The components are added to the resin and mixed in the following order - DC 193, blowing agent catalyst and acid acceptor, where used. The mixture is then cast into a mold measuring 4 × 5 × 2 inches at a temperature of about 80° C. The results are set forth in Table I which follows.

TABLE I

| SAMPLE NO. | ACID ACCEPTOR[1] | GRAMS | ACID ACCEPTANCE VALUE[2] | DENSITY[3] | COMPRESSIVE STRENGTH[4] | COMPRESSIVE MODULUS[4] | CORROSION | FOAM pH |
|---|---|---|---|---|---|---|---|---|
| 1 | Control | — | — | 6 | 114 | 4710 | severe | 2.9 |
| 2 | A | 4.5 | 0.24 | 6.2 | 148 | 5190 | nil | 7 |
| 3 | B | 6.75 | 0.144 | 4.1 | 71 | 2920 | nil | 8.5 |
| 4 | C | 12 | 0.106 | 7.7 | 160 | 5700 | nil | 8 |
| 5 | D | 6.75 | — | 6.5 | 150 | 5500 | severe | 2.8 |
| 6 | E | 2.12 | 0.61 | foam collapsed - no cure | | | | |

FOOTNOTES:
[1]See page 17 for description of acid acceptors
[2]Grams HCl neutralized per gram of acceptor
[3]Pounds per cubic foot
[4]Pounds per square inch When the acid acceptors are subjected to the hereinbefore described pH test, the results set forth in Table II on the following page are obtained.

TABLE II

| SAMPLE NO. | EXPOSURE TIME | ACID ACCEPTORS | | | | |
|---|---|---|---|---|---|---|
| | | A | B | C | D | E |
| 1 | — | 1.0 | 1.0 | 1.0 | 1.0 | 1.0 |
| 2 | 6 min. | 1.1 | 1.1 | 1.0 | 1.05 | 12.0 |
| 3 | 12 min. | 1.2 | 1.15 | 1.2 | 1.1 | 12.4 |
| 4 | 30 min. | 1.25 | 1.25 | 1.22 | | |
| 5 | 1 hour | 1.4 | 1.4 | 1.25 | | |
| 6 | 3 hours | 1.8 | 1.5 | 1.30 | | |
| 7 | 6 hours | 5.5 | 1.55 | 1.35 | | |
| 8 | 72 hours | 10.9 | 2.3 | 1.65 | ↓ | ↓ |
| 9 | *78 hours | | 6.2 | 2.5 | | |

*Samples after 72 hours were heated to 85° C and held at this temperature for 30 minutes, then they were cooled to room temperature and the pH measured.

DESCRIPTION OF ACID ACCEPTORS

A. A sodium silicate sold under the trade name SS65 Powder by The Philadelphia Quartz Company; analysis - 23.1 percent $Na_2O$; 74.4 percent $SiO_2$; 99 percent passing through a 65 mesh Tyler screen.

B. Hollow glass microspheres having diameters ranging from 10 to 100 microns and a glass composition which analyzes 77.5 percent $SiO_2$; 13.5 percent $Na_2O$; 3.25 percent $B_2O_3$; 3 percent $K_2O$; 1.4 percent CaO; 0.2 percent $Al_2O_3$ sold under the trade designation of IG-101 by Emerson and Cuming, Inc., Massachusetts.

C. Hollow glass microspheres having diameters of from 30 to 200 microns and the glass composition analyzing 79.5 percent $SiO_2$; 12.1 percent $Na_2O$; 4.85 percent $B_2O_3$; 3 percent $K_2O$; 0.15 percent $Al_2O_3$, sold under the trade designation of Eccospheres R by Emerson and Cumming, Inc.

D. Glass microspheres having diameters from about 30 to 125 microns and a glass composition analyzing 90 percent $SiO_2$; 4.05 percent $Na_2O$; 3 percent $K_2O$; 2.54 percent $B_2O_3$ and 0.15 percent $Al_2O_3$. These microspheres are sold under the trade designation of SI by Emerson and Cuming, Inc.

E. Anhydrous Na metasilicate is 51 percent $Na_2O$ and 47 percent $SiO_2$ and is sold under the trade designation of Metso beads 2048 by The Philadelphia Quartz Company.

The foregoing analysis of B, C and D were obtained by atomic emission spectroscopy.

EXAMPLE 2

Employing the resole resin of Example 1, two castings are prepared by employing in each casting 45 grams of the resole resin; 1.8 cubic centimeters of a 1:1 mixture of 37 weight percent hydrochloric acid and one part of ethylene glycol. Into one of the mixtures is placed 2.6 grams of glass microspheres commercially available under the designation of IG-101 (acid acceptor B of Example 1). Each of the formulations is mixed in an 8 ounce paper cup and placed in an air oven having a temperature of 80° C. Each of the mixtures is cured in the air oven for a period of 30 minutes. The cured mixtures are then removed from the air oven and allowed to age for two hours under ambient conditions. Holes one eighth inch in diameter are drilled through the center of each casting and an eighth inch mild steel rod inserted through the casting. The samples having the steel rod are aged at ambient temperature and humidity for a period of 24 hours and the steel rods removed from the holes. The rod from the sample which contained no microspheres shows signs of substantial corrosion while the rod removed from the casting containing the glass microspheres shows no significant corrosion. Similar beneficial results are achieved when solid acid acceptors are employed which meet the hereinbefore delineated requirements.

EXAMPLE 3

A phenolic foam is prepared employing the following recipe: 240 grams of the phenolic resin employed in Example 1; 2.88 grams of the alkylsiloxane block copolymer of Example 1; 36 grams of expandable microspheres, the expandable microspheres have a polymer shell of a polymer of about 70 weight percent vinylidene chloride and about 30 weight percent acrylonitrile and contain a single symmetrically encapsulated droplet of isobutane; 9.6 cubic centimeters of a catalyst, the catalyst consisting of equal parts of concentrated aqueous hydrochloric acid and ethylene glycol; 12 grams of hollow glass microspheres (microspheres B of Example 1) having an acid acceptance value of 0.144 gram of hydrochloric acid per gram of glass microspheres. The components are added to the resole resin in the order given with vigorous agitation and immediately placed in a mold measuring $4 \times 5 \times 2$ inches at a temperature of about 75° C. The mold is removed from the air oven after a period of about 4 hours and the foam is composed of closed spherical small cells and has a density of 25.2 pounds per cubic foot; compressive strength of 1030 pounds per square inch; compressive modulus of 38,600 pounds per square inch; flexural strength of 989 pounds per square inch and a flexural modulus of 60,000 pounds per square inch. The foam is tested for its corrosion characteristics by inserting a steel razor blade therein in the manner of Example 1. No corrosion is observed. A portion of the foam is subjected to the hereinbefore described pH test and the value obtained is 9.1.

EXAMPLE 4

The procedure of Example 3 is repeated employing the following recipe: 30 grams of resole resin in Example 1; 1.44 grams of the alkylsiloxane of Example 1; 2 cubic centimeters of symmetrical trichlorotrifluoroethane; 2 cubic centimeters of 65 percent aqueous phenol sulfonic acid; 2 grams of glass microspheres (microspheres B of Example 1). When the resultant foam is evaluated for corrosion, none is observed on the razor blade and the foam pH test gives a value of 8. When the foregoing procedure is repeated with the exception that the glass microspheres are omitted, the steel razor blade employed shows significant corrosion.

EXAMPLE 5

A resole resin foam is prepared in the following manner: 360 grams of the resole resin of Example 1; 18 grams of the vinylidene chloride/acrylonitrile microspheres of Example 3; 25.2 grams of a Kaolin clay commercially available under the designation of Hydrite 10; 19.2 cubic centimeters of a catalyst of a 1:1 by volume mixture of concentrated hydrochloric acid and one part of ethylene glycol, and 24 grams of the glass microspheres B of Example 1. The components are added in the order given with mechanical agitation to the resole resin. The mixture is quickly placed in a closed mold at 80° C for one hour. After this period of time, the foam is removed from the mold and aged for a period of 6 hours at room temperature. A steel razor blade is placed within the foam and the foam stored at ambient temperature and humidity for 72 hours. When the razor blade is removed, no corrosion is observed. A sample of foam is tested for pH value using the hereinbefore described pH test. The physical properties of the foam are as follows: density — 39.5 pounds per cubic foot; no observed open cells; compressive strength — 3000 pounds per square inch; compressive modulus — 60,000 pounds per square inch; flexural strength — 1527 pounds per square inch; flexural modulus — 88,450 pounds per square inch.

EXAMPLE 6

A resole resin foam is prepared employing the following recipe: 30 grams of the resole resin of Example 1; 0.36 gram of the alkylsiloxane block copolymer of Example 1; 3.2 cubic centimeters of a catalyst emulsion and 1.6 grams of glass microspheres (the microsphers B of Example 1). The catalyst emulsion is an emulsion of 20 cubic centimeters of normal hexane; 0.1 gram of an ethylene ethoxy ether having the formula $C_9H_{19}.C_6H_4.O(CH_2H_4O)_{15}H$; 12 cubic centimeters of a 1:1 mixture of concentrated hydrochloric acid and ethylene glycol. The catalyst emulsion is dispersed by vigorous agitation to provide a generally stable colloidal dispersion. The components of the foam are added to the resole resin in the order given with rapid agitation. The temperature of the mixture is raised to 50° C before the addition of the catalyst emulsion. Full expansion of the mixture is obtained within about 3 minutes and the foam cured in an air oven for 30 minutes at 80° C. The foam has a density of 2.5 pounds per cubic foot, shows no corrosion on a steel razor blade after the 72 hours at ambient temperature and humidity. The pH of the foam as determined by the hereinbefore delineated test is 7.8.

As is apparent from the foregoing specification, the present invention is susceptible of being embodied with various alterations and modifications which may differ particularly from those that have been described in the precedubg specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the preparation of thermoset synthetic resinous resole bodies, the steps of the method comprising providing in intimate admixture (a) a resole resin, (b) a catalyst for the resole resin, the catalyst comprising a strong inorganic or organic acid, curing the mixture until the mixture has hardened to a self-supporting mass, the improvement which comprises
including within said mixture a corrosion retarding agent consisting essentially of a particulate, inorganic, solid, acid-accepting material in at least a stoichiometric amount based on the catalyst, with the further limitation that when two parts by weight of the acid-accepting material are added with gentle stirring to 100 parts by weight of a solution of hydrochloric acid in deionized water, the solution having a pH of 1, at a temperature of 25° C, the pH of the solution increases from about 0.1 to about 1 pH unit in 60 minutes, the particulate material having an acid-accepting value of from about 0.08 to 0.3 grams of hydrochloric acid as determined by dispersing one gram of an acid acceptor in 100 milliliters of 0.1 normal aqueous hydrochloric acid, the dispersion is agitated for 24 hours at a temperature of 25° C and titrated with 0.1 normal aqueous sodium hydroxide to a pH of 7, the weight in grams of hydrochloric acid neutralized by the acid acceptor is then calculated and is the acid-accepting value, to thereby provide a cured resole resinous body having a reduced tendency to corrode steel.

2. The method of claim 1 wherein the acid-accepting material has an acid-acceptance value of from about 0.1 to 0.25 grams of hydrochloric acid.

3. The method of claim 1 including the step of admixing a foaming agent with the resole resin, catalyst and microspheres.

4. The method of claim 1 wherein the acid-accepting material is particulate glass.

5. The method of claim 1 wherein the acid-accepting material is glass microspheres.

6. The method of claim 1 wherein the acid-accepting material is particulate sodium silicate.

7. An improved cured resole resin having a reduced tendency to corrode steel, the resole resin comprising a body of a continuous cured resole resin containing a plurality of particles of a solid, inorganic, acid-accepting material present in at least a stoichiometric amount based on acid catalyst used to cure the resin, with the further limitation that when two parts by weight of the acid-accepting material is dispersed with stirring in 100 parts by weight of an aqueous solution of hydrochloric acid at 25° C, the solution having a pH of 1, the pH of the solution increases from about 0.1 to about 1 pH unit within a period of 60 minutes.

8. The cured resole resin of claim 7 having a plurality of gas-containing cells.

9. The body of claim 7 wherein the acid-accepting material is particulate glass.

10. The body of claim 7 wherein the acid-accepting material is glass microspheres.

11. The body of claim 7 wherein the acid-accepting material is particulate sodium silicate.

* * * * *